United States Patent [19]

Gaudichon

[11] Patent Number: 5,786,784
[45] Date of Patent: Jul. 28, 1998

[54] REMOTE-CONTROL DEVICE FOR A VIDEO RECEIVER

[75] Inventor: Patrice Gaudichon, Suresnes, France

[73] Assignee: U.S. Philips Corporation, New York, N.Y.

[21] Appl. No.: 715,686

[22] Filed: Sep. 18, 1996

[30] Foreign Application Priority Data

Sep. 20, 1995 [FR] France .................. 95 11037

[51] Int. Cl.⁶ .................................................. H03J 9/06
[52] U.S. Cl. ................. 341/176; 455/410; 340/825.72; 340/825.56; 341/173
[58] Field of Search ........................ 341/173, 176; 340/825.69, 825.72, 825.31, 825.56; 364/423.019; 348/114, 164, 166; 455/410

[56] References Cited

U.S. PATENT DOCUMENTS

| | | | |
|---|---|---|---|
| 4,496,942 | 1/1985 | Matsuoka | 340/825.57 |
| 4,529,980 | 7/1985 | Liotine | 341/176 |
| 4,535,333 | 8/1985 | Twardowski | 340/825.69 |
| 4,912,463 | 3/1990 | Li | 340/825.69 |
| 5,097,260 | 3/1992 | Ahn | 340/525.56 |
| 5,406,274 | 4/1995 | Lambropoulos | 340/825.72 |
| 5,500,888 | 3/1996 | Chiu | 455/410 |
| 5,603,078 | 2/1997 | Henderson | 341/176 |

FOREIGN PATENT DOCUMENTS

0417735a2 3/1991 European Pat. Off. .

Primary Examiner—Michael Horabik
Assistant Examiner—Albert K. Wong
Attorney, Agent, or Firm—Edward W. Goodman

[57] ABSTRACT

A remote-control unit for a video receiver is provided, inter alia, with a numerical keyboard (23) for transmitting code numbers between 0 and 9, and, as the video receiver is provided with a credit card reader for allowing payments, the remote-control unit comprises enciphering means for transmitting, during activation of a key from 0 to 9, a code representing a numerical value J which is different from the value I corresponding to the activated key, such that for I between 0 and 9, J is also between 0 and 9.

9 Claims, 1 Drawing Sheet

REMOTE-CONTROL DEVICE FOR A VIDEO RECEIVER

BACKGROUND OF THE INVENTION

1. Field of the Invention

The invention relates to a remote-control device for a video receiver, comprising a remote-control unit provided with keys for transmitting messages in response to the activation of the keys, and a video receiver provided with means for receiving said messages, the remote-control unit being provided with enciphering means for transmitting ciphered messages, and the video receiver being provided with reciprocal means for deciphering the messages.

2. Description of the Related Art

A remote-control device for a television receiver as described in the opening paragraph is known from the European Patent Application EP-A-0 417 735. The device described in this document has for its object to prevent theft of remote-control units from hotel rooms. To this end, all the keys of these units are ciphered in such a way that the remote control cannot function when it is used with a television receiver other than that in the hotel.

SUMMARY OF THE INVENTION

It is an object of the invention to provide a remote-control system which ensures confidentiality of transmission of a secret personal code to the video receiver by means of the remote-control device when it is desired to exchange messages or transactions of an economic character by means of a home-video receiver associated with a smart card, for example, a credit card, or chip card, the remote-control device remaining compatible with the standard television receiver.

To this end, the remote-control unit comprises, inter alia, so-called numerical keys, each marked by a character representing a numerical value and intended for transmitting a message representing said numerical value, the enciphering means only acting on the numerical keys for transmitting a message representing a numerical value which is different from that corresponding to the key, with a one-to-one correspondence between the set of said different numerical values and the assembly of values corresponding to each key.

The invention is thus based on the idea to make the series of numbers which may be used in a secret code correspond to another series comprising, in reference with each of these numbers, a different number.

A numerical value of the set of said different numerical values being preferably designated by I and a numerical value of the set of values corresponding to each being designated by J, said one-to-one correspondence has preferably the characteristic feature that for I between 0 and 9, J is also between 0 and 9.

The enciphering means advantageously comprises a table of ten positions in which, in a position corresponding to a first numerical value, a second numerical value is registered which must be transmitted instead of the first value, while each of the digits 0 to 9 is present in the table only once.

For the digits which are generally used in the code of a credit card, namely 0–9, a number of ciphering combinations which is equal to 9! is simply obtained, i.e., 362880.

The remote-control unit is advantageously provided with means at the user's disposal for switching the enciphering means on or off. These means are activated, for example, by simultaneously pressing two predetermined keys or a specific key. The unit also advantageously comprises means for automatically deactivating the encipherment as soon as a key other than the key of the numerical keyboard is activated.

The use of ciphering may thus be limited to operations having an economic character.

A video receiver is advantageously provided with a remote-control device according to the invention.

These and other aspects of the invention will be apparent from and elucidated with reference to the embodiments described hereinafter.

DETAILED DESCRIPTION OF THE PREFERRED EMBODIMENTS

The invention will be described, by way of example, with reference to a television receiver, but it will be evident that it is also applicable to any other type of video receiver provided with a remote-control device.

Figure 1:
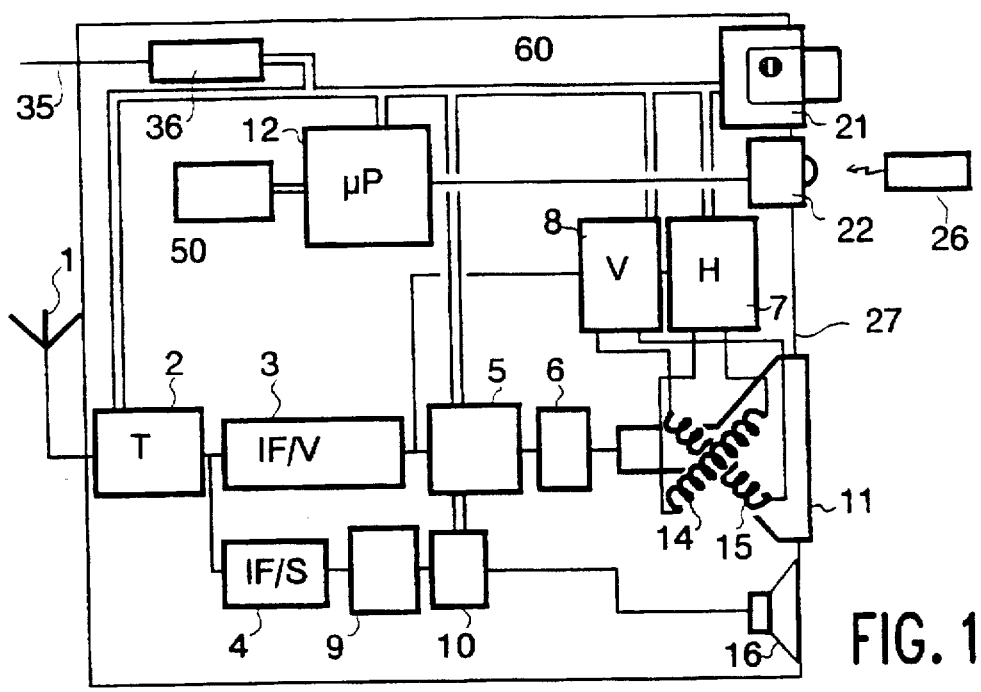
FIG. 1 shows, diagrammatically, a device comprising a remote-control unit and a television receiver provided with a chip card reader.

The device shown in FIG. 1 comprises a television receiver of a known type, comprising:

- a tuner 2 receiving a signal, for example, from an antenna 1 and transposing the signal frequency to intermediate frequencies for a subsequent IF video amplifier 3 and an IF audio amplifier 4,

- a demodulator 9 following the IF audio amplifier 4 and supplying the audio signals in baseband to a power audio amplifier 10 feeding a loudspeaker 16,

- an element 5 following the IF video amplifier 3 and comprising a demodulator which produces a video signal in baseband for a video amplifier 6 supplying the signals for this particular purpose to electrodes of a cathode ray tube 11. The element 5 also comprises a separator for extracting synchronizing signals from the signal supplied by the demodulator, these synchronizing signals being applied to a line scanning stage 7 and a vertical (or field) scanning stage 8 which supply currents in line and field deflection coils 14 and 15,

- a processor 12, generally a microprocessor, for controlling the whole of the functions in the receiver. A memory 50 is provided for storing data such as, for example, the current values of the different controls for the television receiver. The microprocessor is connected by means of a bus 60 to all the elements of the apparatus which may be controlled: the tuner 2 (channel selection), the video and audio circuits 5 and 10 (different level controls), the scanning circuits 7 and 8, (selection of different image aspect-ratios), and

- a control receiver 22 for receiving, in series, infrared signals from a remote-control unit 26 and for transmitting them to the microprocessor 12.

The system also comprises a chip card reader 21 and an interface circuit 36 with a telephone line 35 by means of which various exchanges, for example, commercial transactions, may be realized while paying by means of a credit card inserted into the reader 21. The personal code (secret code) of the user can be communicated to the system by means of the remote-control unit 26.

Figure 2A:
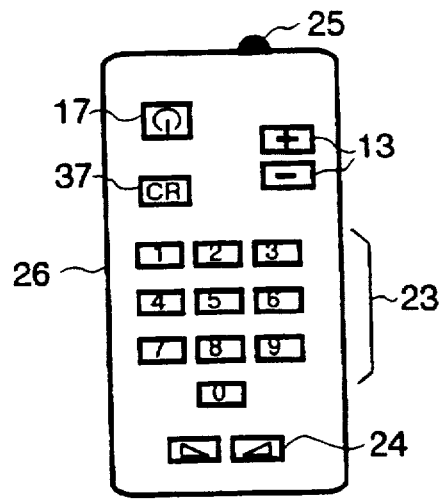
FIGS. 2A and 2B show a remote-control unit and a diagram of a circuit contained in this remote-control unit.

The remote-control unit shown in FIG. 2A comprises, in known manner, a standby key 17, a pair of keys 24 for increasing or decreasing the value of a parameter, for example the sound volume, a numerical keyboard 23 for selecting a channel, keys 13 with which, for example the number of the received channel can be raised or lowered. A personal code can be communicated to the system by means of the keys of the keyboard 23.

Figure 2B:
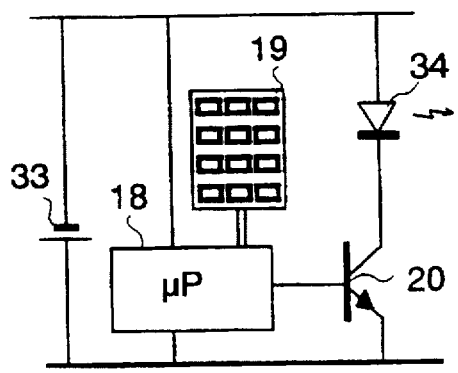

FIG. 2B illustrates an example of a circuit which can be used for such a remote-control unit. A battery 33 feeds a dedicated microprocessor 18 and a light-emitting diode 34 controlled by a transistor 20. A circuit PCA 84 C 122, marketed by the Applicant, is a dedicated microprocessor intended for such usage; it comprises a processor of the type 84 C XXX and the required ROM and RAM memories, and a hardwired modulator which supplies pulses (for the diode 34) whose duration and number are programmable, while it also has an output for controlling the transistor 20.

For switching the enciphering means on or off, the user may simultaneously press two predetermined keys, for example the keys "+" and "0". A specific key 37 may also be provided for this function.

The simultaneous activation of two predetermined keys, or the activation of the specific key 37, alternately sets or resets a flag in a memory of the microprocessor 18 for indicating whether the numerical values must be enciphered. At this event, the microprocessor 18 triggers the emission, via the diode 34, of a message indicating whether the numerical values are henceforth ciphered in order that the receiver 27 is in tune with the transmitter. The enciphering is automatically deactivated as soon as a key other than a key of the keyboard is activated. It may alternatively be deactivated automatically after keys of the numerical keyboard have been pressed four times in succession (i.e. after a four digit number was introduced).

Figure 3:
FIG. 3 illustrates the structure of a message emitted by the remote-control unit.

A control message comprises several successive fields (FIG. 3) as in, for example, the system known as "RC5":

a first field 28 comprising a start bit "one", a second field 29 comprising a bit denoting (in relation with the fifth field) the range 0 to 63 for a control number if it is a one-bit and the range 64 to 127 if it is a zero-bit, a third field 30 comprising a toggle bit which alternates after each message, a fourth field comprising five bits for describing which system is to be activated by the control (video recorder, television receiver, compact disc reader, etc.), and a fifth and last field of six bits comprising the actual message, having a value between 0 and 63, to which the receiver adds 64 if the bit of the second field is zero.

In the RC5 system, the numerical values 0 to 9 are simply indicated by a value of the fifth field, ranging from 0 to 9.

Prior art has proposed, to encipher a numerical value, starting from a value expressed by a binary number of a given length and subjecting it to a logic "exclusive-OR" operation with a key of the same length. Nevertheless, the preferred method is as follows: a table of ten positions is provided in the memory in which, in each position corresponding to a first numerical value, a second numerical value is registered which must be transmitted instead of the first value. For example, 7 is read for the position corresponding to 4, 2 is read for the position corresponding to 5, etc. Each of the digits from 0 to 9 should, however, occur only once in the memory. Whenever a numerical key is touched, the table is consulted and the digit that is read is transmitted instead of the number of the key. The enciphering means are thus constituted by this table and by a part of the microprocessor software used for this purpose. This software only handles the part 32 of the message representing the numerical value, and only if one of the keys 23 is activated and if the above-mentioned flag indicates that an enciphering is required. The truth table in question should be different for each device so that the required confidentiality is ensured.

I claim:

1. A remote-control system comprising a remote-control unit provided with keys for transmitting messages in response to the activation of the keys, and a video receiver provided with means for receiving said messages, the remote-control unit being provided with enciphering means for transmitting ciphered messages, and the video receiver being provided with reciprocal means for deciphering messages, characterized in that the remote-control unit comprises a plurality of command keys for transmitting a message representing a command, and a plurality of numerical keys each marked by a character representing a numerical value and intended for transmitting a message representing said numerical value, the enciphering means only acting on the numerical keys for transmitting a message representing a numerical value which is different from that corresponding to the key, with a one-to-one correspondence between the set of said different numerical values and the set of values corresponding to each key.

2. A remote-control system as claimed in claim 1, characterized in that, if a numerical value of the set of said different numerical values is designated by I and a numerical value of the set of values corresponding to each key is designated by J, said one-to-one correspondence has the characteristic feature that for I between 0 and 9, J is also between 0 and 9.

3. A remote-control system as claimed in claim 2, characterized in that the enciphering means comprise a table of ten positions in which, in a position corresponding to a first numerical value, a second numerical value is registered which must be transmitted instead of the first value, while each of the digits 0 to 9 is present in the table only once.

4. A remote-control system as claimed in claim 1, characterized in that the remote control unit is provided with means at the user's disposal for switching the enciphering means on or off.

5. A remote-control system as claimed in claim 4, characterized in that the means at the user's disposal for switching the enciphering means on and off are activated by simultaneously touching two predetermined keys on the remote control unit.

6. A remote-control system as claimed in claim 4, characterized in that the means at the user's disposal for switching the enciphering means on and off are activated by touching a specific key provided for this purpose on the remote control unit.

7. A remote-control system as claimed in claim 4, characterized in that said system comprises means for automatically deactivating the enciphering in the remote control unit and the deciphering in the video receiver as soon as a key other than one of said numerical keys on said remote control unit is activated.

8. A video receiver for use in a remote-control system as claimed in claim 1.

9. A remote control unit for use in a remote control system as claimed in claim 1.

* * * * *